US007898435B2

(12) United States Patent
Rogers et al.

(10) Patent No.: US 7,898,435 B2
(45) Date of Patent: Mar. 1, 2011

(54) OPTICAL SYSTEM FOR DETECTING AND DISPLAYING AIRCRAFT POSITION AND ENVIRONMENT DURING LANDING AND TAKEOFF

(75) Inventors: Philip L. Rogers, Hume, VA (US); Priyavadan Mamidipudi, Bristow, VA (US); Peter A. Gatchell, Nokesville, VA (US)

(73) Assignee: Optical Air Data Systems, LLC, Manassas, VA (US)

( * ) Notice: Subject to any disclaimer, the term of this patent is extended or adjusted under 35 U.S.C. 154(b) by 322 days.

(21) Appl. No.: 12/085,310

(22) PCT Filed: Feb. 25, 2008

(86) PCT No.: PCT/US2008/002407
§ 371 (c)(1),
(2), (4) Date: May 21, 2008

(87) PCT Pub. No.: WO2008/103478
PCT Pub. Date: Aug. 28, 2008

(65) Prior Publication Data
US 2009/0140885 A1   Jun. 4, 2009

Related U.S. Application Data
(60) Provisional application No. 60/902,882, filed on Feb. 23, 2007.

(51) Int. Cl.
*G01C 21/00* (2006.01)
(52) U.S. Cl. .................. 340/973; 340/977; 340/945; 340/951; 356/622; 356/916

(58) Field of Classification Search ............... 340/973, 340/977, 945, 949, 951, 956, 963, 968, 969, 340/970; 356/28, 4.08, 916, 924, 73.1, 477, 356/478, 614, 622, 906
See application file for complete search history.

(56) References Cited

U.S. PATENT DOCUMENTS

| 3,846,746 | A | * | 11/1974 | Trageser et al. | 340/961 |
| 5,272,513 | A |   | 12/1993 | Vahala et al. |  |
| 5,396,425 | A | * | 3/1995  | Carlson | 701/14 |
| 6,076,042 | A | * | 6/2000  | Tognazzini | 701/301 |
| 6,434,085 | B1| * | 8/2002  | Nedwell | 367/100 |

(Continued)

OTHER PUBLICATIONS

Search Report, dated Jun. 11, 2008, for PCT Appl. No. PCT/US2008/002407, 1 page.

(Continued)

*Primary Examiner*—Toan N Pham
(74) *Attorney, Agent, or Firm*—Sterne, Kessler, Goldstein & Fox P.L.L.C.

(57) ABSTRACT

A system and method uses light signals to detect and display the position of an airborne vehicle, such as a helicopter, during takeoff or landing or low speed, low altitude operation. A transmitter on the vehicle emits light signals while an optical receiver retrieves reflected light signals. Using light detection and ranging techniques, various parameters, such as altitude, ground speed and relative wind, are calculated based on the Doppler shift within the reflected light signals. The signals are transmitted in three different directions to facilitate the measurements of different Doppler shifts. The parameters are also displayed on a screen or other visual device within the vehicle.

22 Claims, 3 Drawing Sheets

U.S. PATENT DOCUMENTS

| | | | |
|---|---|---|---|
| 6,980,153 B2 * | 12/2005 | Hager et al. | 342/120 |
| 7,184,072 B1 * | 2/2007 | Loewen et al. | 348/144 |
| 7,400,386 B2 * | 7/2008 | Jamieson et al. | 356/28.5 |
| 7,557,734 B2 * | 7/2009 | Estrada et al. | 340/963 |
| 2003/0036827 A1 | 2/2003 | Murphy | |
| 2003/0130791 A1 | 7/2003 | McIntyre | |
| 2004/0169844 A1 | 9/2004 | Wong et al. | |
| 2004/0246463 A1 | 12/2004 | Milinusic | |
| 2005/0062955 A1 | 3/2005 | Deines | |
| 2006/0126055 A1 | 6/2006 | Meneely et al. | |

OTHER PUBLICATIONS

International Preliminary Report on Patentability, dated Aug. 26, 2009, for PCT Appl. No. PCT/US2008/002407, 5 pages.

* cited by examiner

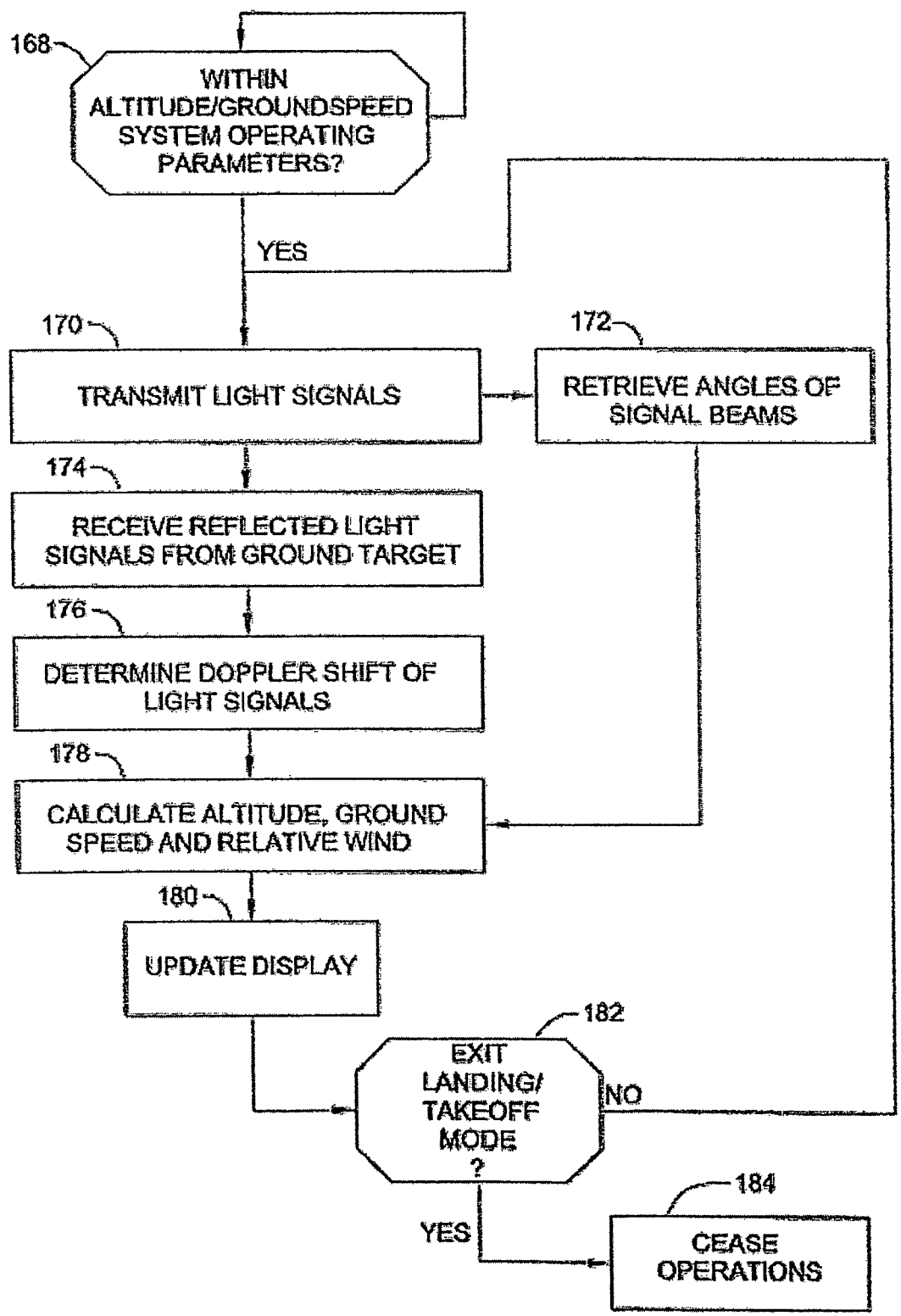

OPTICAL SYSTEM FOR DETECTING AND DISPLAYING AIRCRAFT POSITION AND ENVIRONMENT DURING LANDING AND TAKEOFF

This application is the national stage of International Application Number PCT/US2008/002407, filed Feb. 25, 2008, which was published in English, and claims priority of U.S. Provisional Application No. 60/902,882, filed Feb. 23, 2007.

FIELD OF THE INVENTION

The invention relates to systems that determine the position of an aircraft as well as ambient conditions, particularly during takeoff, landing, or low altitude, low speed flight. More particularly, the present invention relates to a system using a laser-based sensor to facilitate safe landing, takeoff, and low altitude, low speed flight, particularly in conditions of limited visibility.

BACKGROUND ART

Aircraft landing and takeoff operations are particularly dangerous in adverse weather or under conditions of limited visibility. Aircraft, particularly helicopters, are very difficult to operate during landing when the pilot is unable to observe adequately the motion of the helicopter with respect to the landing area. For example, as a helicopter approaches a landing site in a desert, downwash from the rotors typically stirs up the sand, which greatly reduces visibility. This is very dangerous because the pilot cannot adequately observe the landing area to obtain the necessary visual feedback of the aircraft's speed and position. A helicopter is particularly vulnerable if the pilot is unaware that the helicopter is drifting laterally as it touches down. Similarly, lateral drift resulting from an unexpected cross wind may cause the aircraft to roll, as for example when a skid engages the ground during takeoff or landing.

While optical systems for measuring air speed are known, such as that shown in U.S. Pat. No. 5,272,513, known altitude and ground speed detection systems are too slow when used in conditions of low visibility to allow the pilot, or even automatic equipment, to respond quickly enough for the aircraft to be maneuvered safely when near the ground.

Further, in a military context those systems that use radio frequency (RF) emissions to measure the altitude of an aircraft during landing, for example, can be detected and reveal the location of the aircraft to the enemy.

SUMMARY OF THE INVENTION

In accordance with the invention, a measuring and display system for an aircraft provides critical information, primarily to a pilot or an autopilot, of the aircraft's altitude, ground speed, and airspeed, and the wind velocity during virtually all conditions. (Altitude as used herein means the height of the aircraft above ground level (AGL) unless otherwise noted.) The invention relies principally on optical measuring systems, which advantageously cannot be easily detected by others, and provide extremely fast response times. Thus, the invention addresses the problems described above.

The embodiments of the present invention include a precision approach and landing system and a laser airspeed sensor method that enables a safer flight when operating in a degraded environment, such as a brownout, whiteout, night operations and the like. The disclosed embodiments use a fiber optic, laser-based sensor to measure the altitude, vertical velocity, ground speed, airspeed and the like for all types of aircraft, particularly including helicopters.

According to the disclosed embodiments, a laser sensor is capable of measuring the altitude and ground velocity (i.e., speed and direction) of an aircraft even in severe weather or in conditions of reduced visibility and of displaying such data in an effective manner to a pilot. When combined with other laser sensor systems capable of measuring air speed, the invention provides the pilot with information that greatly improves the safety of landing an aircraft in extreme conditions.

Thus, the embodiments of the present invention provide highly accurate data regarding ground speed and altitude and airspeed in a highly accurate manner without producing RF emissions. Further, implementation of the present invention reduces the overall weight of the aircraft by replacing heavier current detection systems and allowing removal of unnecessary equipment. The instruments of the invention may be portable to allow easy installation in the aircraft or removal.

The characteristics of sand particles vary depending on the environment, and the parameters of the system according to the invention can be adjusted to meet particular conditions. For example, sand particles found in the desert differ from sand particles or debris found in grassland operations. Accordingly, it is within the scope of the invention to utilize lasers and electronic sensors that accommodate different characteristics.

The embodiments of the present invention enable landing in a degraded, usable-cue environment and flight operations in low visibility environments. In accordance with a preferred embodiment of the invention, the altitude, ground speed, direction, and airspeed of an aircraft at low altitude, such as during landing or takeoff, is measured by one or more fiber laser systems directing a plurality of beams toward the ground and into the air and receiving Doppler-shifted return beams to measure ground speed and air speed, respectively. The altitude of the aircraft may be measured by modulating one of the previously mentioned beams or a separate beam for use as LIDAR to determine the slant distance to the ground and correcting that distance trigonometrically by a signal from an artificial horizon to determine altitude of the aircraft.

In accordance with another feature of the invention, the velocity of the wind with respect to the ground is measured and displayed to the pilot before takeoff to provide information regarding the direction in which the aircraft is likely to drift immediately after takeoff. This is particularly important for a helicopter and is preferably accomplished by directing light beams such as those used for measuring airspeed to a location just beyond the rotors, as this has been determined to be a location that is less likely to be affected by the prop-wash of the rotors. Measuring the airspeed when the aircraft is stationary on the ground provides a measure of the wind velocity that can be effectively displayed to the pilot.

In accordance with a still further feature of the invention a unique display is provided that displays the ground speed and direction, airspeed and the wind speed before takeoff and during flight in such a manner that reference to the direction of the longitudinal axis of the aircraft is easily and graphically determined. Such a display, for example, allows the pilot to orient the helicopter into the wind immediately after takeoff to reduce the possibility of lateral drift, which could be very dangerous. On landing, such a display allows the pilot to assess the speed and direction of lateral drift of the helicopter and to take appropriate corrective action to prevent roll over.

It is an object of this invention to provide a system for increasing the safety of landing and takeoff during conditions of reduced visibility.

It is a further object of the invention to provide a system for measuring and displaying ground drift during landing.

It is a still further object of the invention to provide a system for measuring and displaying wind velocity.

Yet another object is to determine and display airspeed.

Other objects and advantages will be apparent to those of skill in the art.

BRIEF DESCRIPTION OF THE DRAWINGS

FIG. 3 is a flowchart for detecting and displaying aircraft position and other information according to the disclosed embodiments.

DETAILED DESCRIPTION OF THE PRESENT INVENTION

Reference will now be made in detail to the preferred embodiments of the present invention, examples of which are illustrated in the accompanying drawings.

Figure 1:
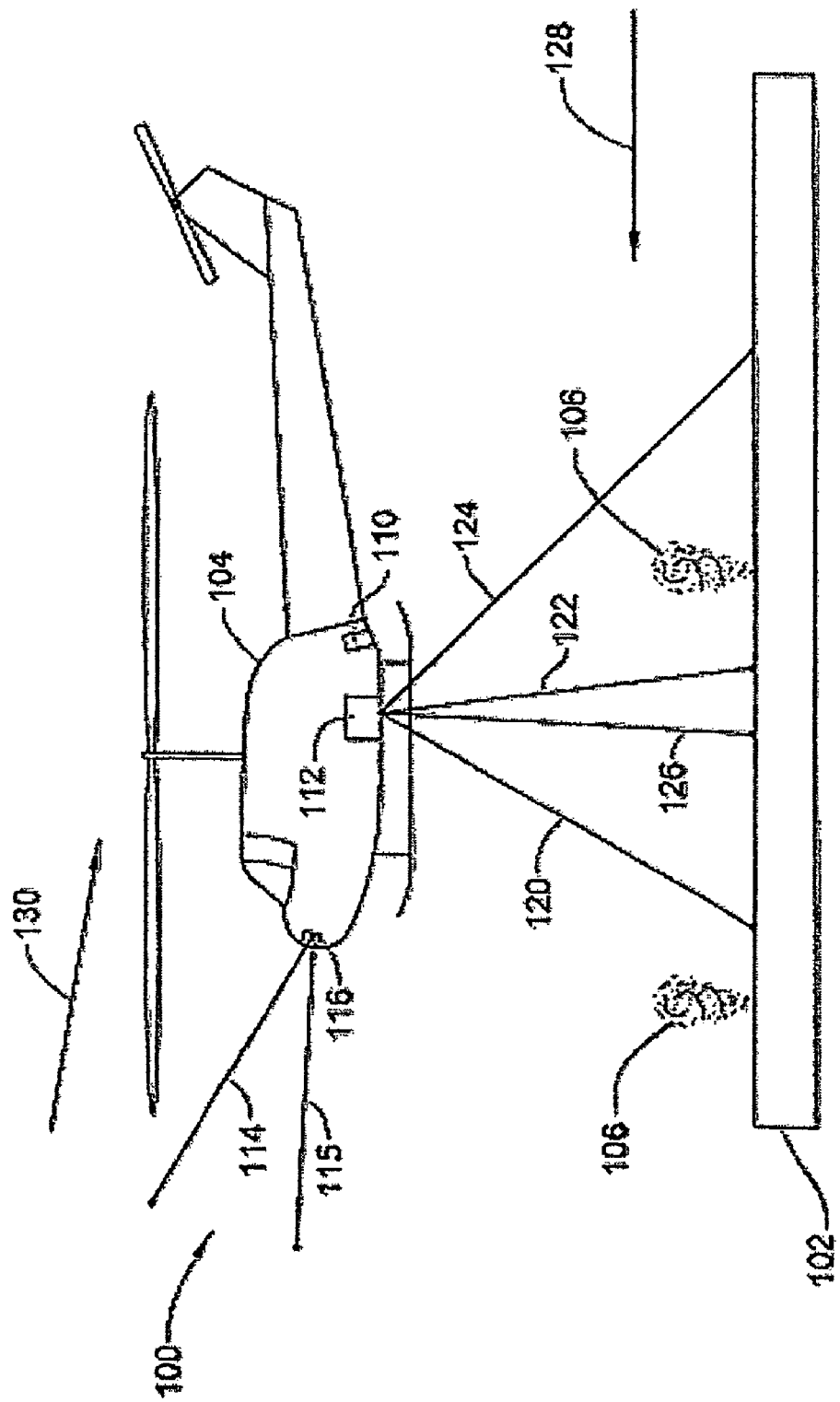
FIG. 1 illustrates an aircraft having a system for detecting the position of the aircraft according to the disclosed embodiments.

FIG. 1 depicts an aircraft landing site 100 and an aircraft 104 that is landing or taking off (or hovering), which includes a system for detecting the position and motion of aircraft 104 according to the disclosed embodiments. While the aircraft 104 illustrated in FIG. 1 is a helicopter, the invention is useful with other types of aircraft as well.

The invention is useful in many different conditions but finds particular utility in those situations where the ground 102 in the landing area comprises easily disturbed sand particles 106 that aircraft 104 stirs up as it lands or takes off, typically because of the downwash from the rotor blades of the helicopter 104. In many environments, such as that of a desert, the sand 106 reduces the visibility by such a degree that the pilot cannot see the ground, which creates a very dangerous condition. The invention may find a similar utility when a landing or takeoff is made at night without artificial lighting, or in fog or snow.

In accordance with the invention, aircraft 104 is provided with equipment and systems to measure the altitude, air speed and ground speed and to display such data to the pilot to facilitate operating the aircraft in conditions of reduced visibility. The equipment and systems may include an instrument package 110 comprising electronics and laser light sources mounted in the aircraft, and an optics head 112, which is configured to direct the measuring beams in the desired directions. The electronics and lasers 110 may be mounted anywhere in the aircraft, but the optic head 112 is preferably mounted near the bottom of aircraft 104 and towards its rear to facilitate directing the optical measuring beams from the bottom. In a preferred embodiment, the optics head 112 is positioned to direct the measuring beams toward the rear of the main part of the fuselage of the helicopter, but other orientations may be found advantageous. It is contemplated that the optics head will be positioned on each aircraft in accordance with the particular characteristics of that aircraft to reduce interference with or blockage of signals coming from or entering the optics head 112.

The light sources contained in the electronics package emit light beams, such as is described in the noted U.S. Pat. No. 5,272,513, through the optics head 112 but directed toward the ground preferably in three directions. Exemplary such beams are shown at 120, 122, and 124. These beams provide data for determination of the ground speed of the aircraft by detecting the Doppler shifts in each of the backscattered beams. The velocities measured by these beams are combined in known manner to provide a single ground speed vector that is displayed to the pilot as will be explained further below.

It will be appreciated that the signals scattered from the ground 102 may be distinguished from those scattered by the air molecules or the sand particles because they are of different shape. As well, if the light beams are pulsed, as is preferred, the light scattered from the ground will be the last light returned from the pulse.

A third light beam 126 is part of a light detection and ranging (LIDAR) system provided to measure the altitude of the aircraft. This beam utilizes a pulsed beam as known in the art to measure a slant distance, which is a function of both the orientation of the optical system in the aircraft and the attitude of the aircraft, as well as the altitude of the aircraft. The orientation of the optical system in the aircraft is known, and the attitude of the aircraft can be determined in any of several known ways. In the preferred embodiment, the attitude of the aircraft is determined by a gyroscope, and a signal from that instrument is combined in known fashion, e.g., trigonometrically, to determine the altitude of the aircraft. The gyroscope may be part of the electronics package 110, separate, or an instrument used also for other purposes on the aircraft.

It will be appreciated that any of the ground speed beams 120, 122, or 124 may be modulated to serve also as the altitude-measuring beam, thus obviating the need for the additional beam 126. As well, the beams including altitude beam 126 could be analyzed for Doppler shifts to ascertain vertical velocity, or the rate of change in the altitude measurement could be calculated to determine vertical velocity.

Referring to FIG. 1, the light beams 120, 122, 124, and 126 are transmitted from and received by the optics head 112. The reflected or backscattered beams 120, 122, and 124 measure the velocity of the aircraft with respect to the ground, i.e., in the X-Y plane, and the beam 126 measures altitude of the aircraft in the vertical direction. The beams 120, 122, 124, and 126 are preferably provided to the optics head by separate optical fibers, but other arrangements, such as multiplexing, are within the scope of the invention. The optics head 112 provides optical elements such as lenses to direct the beams in the desired direction using structures known in the art.

The system of the invention also provides measurement of airspeed and relative and magnetic wind velocity, when the aircraft is airborne, or wind velocity when the aircraft is at rest on the ground. The relative wind 130 when the aircraft is airborne is illuminated by beams 114, 115 from one or more lasers located on the aircraft such as that illustrated at 116 to measure airspeed of the aircraft in accordance with known principles. This same beam may also be used to measure the wind velocity when the aircraft is preparing to takeoff to provide the pilot with information that could seriously affect the aircraft immediately after take off, such as an adverse condition that might cause the aircraft to drift sideways. Under ambient conditions of restricted visibility, the pilot may not know of adverse conditions until it is too late. The wind velocity is preferably displayed to the pilot in accordance with the display to be described below in connection with FIG. 2. The laser 116 is preferably located at the front of the aircraft and aimed upward, but it will be appreciated that other arrangements, such as multiple beams or beams located at the side of the aircraft, are within the scope of the invention.

In the embodiment shown, airspeed beams 114, 115 are aimed upward to accommodate pitch motions of the helicopter. This orientation, however, means that the measurement provides airspeed that is not in the plane of the helicopter (i.e., the direction of the longitudinal axis of the helicopter). This may be corrected in any of several ways. First, a correction may be made by using a measurement of the vertical airspeed. Alternatively, airspeed in the plane of the helicopter may be determined by using a three axis measurement by providing three airspeed beams, or a two-axis measurement may be combined with a ground speed measurement if there is no vertical wind, or a two-axis measurement may be combined with a vertical velocity obtained by determining the rate of change of the altitude (e.g., by taking the first derivative of the altitude measurement from beam 126).

In accordance with another feature of the invention, the data derived from the light beams as described is displayed to the pilot in a particularly useful manner to allow the pilot to maneuver the aircraft safely during take off or landing.

Figure 2:
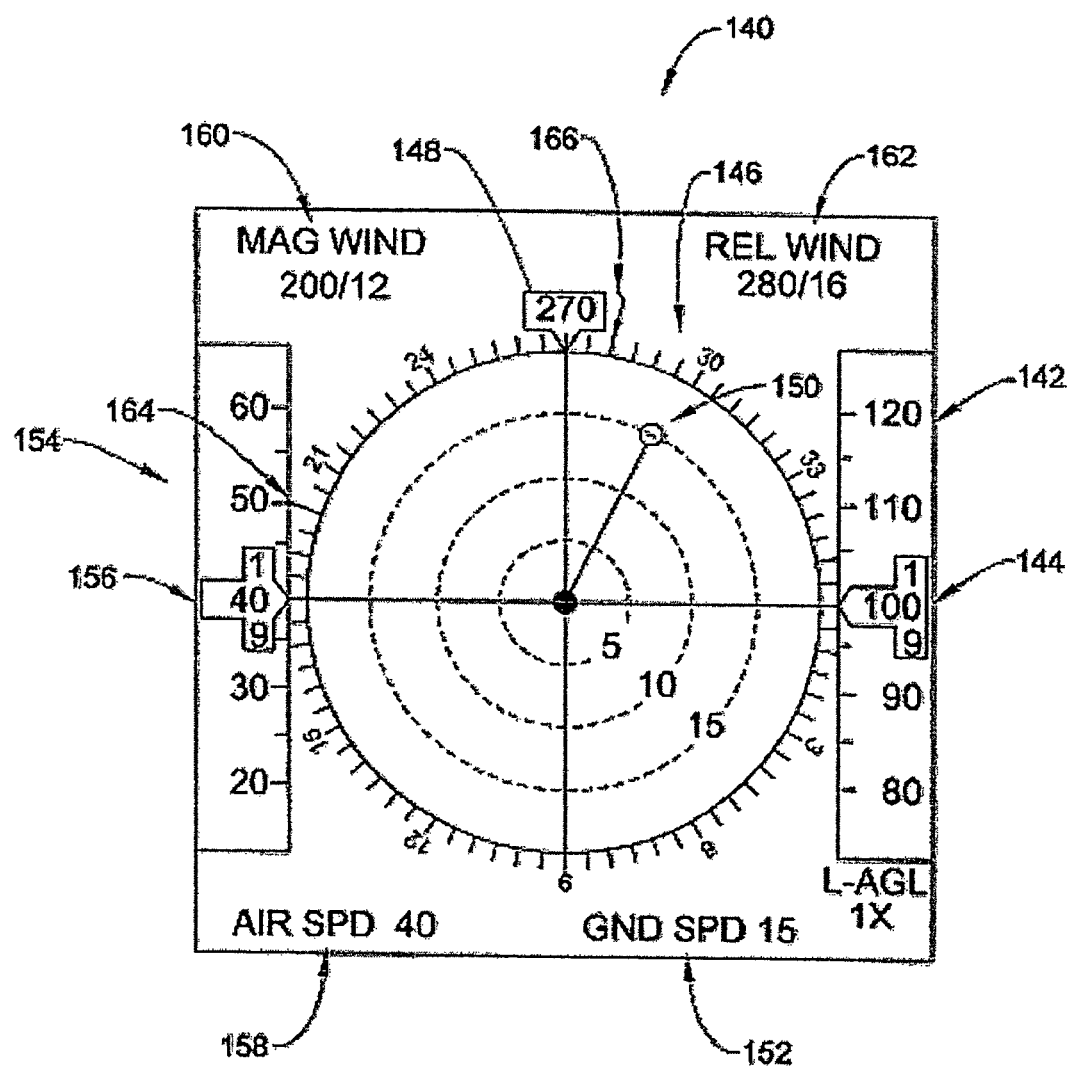
FIG. 2 illustrates a display for showing aircraft position and environment according to the disclosed embodiments.

FIG. 2 depicts a preferred display 140 for display of the aircraft's altitude, orientation (i.e., heading), ground speed, and ambient environment. Display 140 is preferably located in the cockpit of an aircraft within easy view of the pilot to provide the information determined by the present invention, as disclosed above, visually. Display 140 is preferably a heads-up display but may take other forms.

A first aspect of the display 140 is the display of the laser altitude. The laser altitude, measured by beam 126, may be displayed on graduated scale 142, the altitude being indicated by an indicator 144, which is preferably digital. The scale 142 and indicator 144 may take other forms and orientations, such as horizontal or circular. The display shown, however, is intuitive, and the significance of the displayed data can be visualized easily by the pilot.

In accordance with another aspect of display 140, the heading of the aircraft is illustrated in known manner by, for example, a directional gyroscope having a rotating compass 146 and a mark 148 representing the front of the aircraft. Thus, the display shown in FIG. 2 indicates the heading of the aircraft to be 270°. In accordance with the invention, the ground speed measured by beams 120, 122, and 124 is displayed by a groundspeed vector 150. This vector is superimposed on the heading display such that the direction of the vector 150 indicates the direction of the aircraft's ground speed with reference to the longitudinal axis of the aircraft, and the length of the vector 150 indicates the speed. The display also conveniently has groundspeed indicia 152 to allow the pilot to quantify the groundspeed.

The orientation of vector 150 is shown in display 140 to be at about 30° to the longitudinal axis of the aircraft, indicating to the pilot that the aircraft will engage the ground on touchdown with a relative movement in that direction. The length of the vector 150 allows the pilot to quantify the groundspeed to determine whether the relative movement in the noted direction requires corrective action.

The groundspeed vector may be displayed only when the aircraft is at or below a predetermined altitude. For example, the vector 150 may be displayed only when the aircraft is less than, say, three hundred feet above the ground, as the groundspeed above that altitude may be determined form other sources that do not require the accuracy of the system described herein. That is, ground speed is regularly measured in aircraft by GPS systems, radar systems, and the like, but the accuracy and response time of such measurements is too poor to be of use during landing.

The airspeed of the aircraft in the direction of the longitudinal axis is displayed on the graduated scale 154, the airspeed being digitally indicated on the pointer 156. The display also conveniently has airspeed indicia 158 to allow the pilot to quantify the airspeed.

Other parameters contained in the display 140 are the magnetic and relative wind. The magnetic wind speed and direction indicia 160 indicate the wind speed and direction relative to magnetic north. The relative wind speed and direction indicia 162 indicate the wind speed and direction with respect to the longitudinal axis of the aircraft. The directions of the magnetic wind and the relative wind are indicated by moving vectors along the outer edge of the rotating compass 164 and 166, respectively. As disclosed above, a strong wind may cause the aircraft, particularly a helicopter, to tip over during takeoff because the aircraft will begin to move in the direction of the wind as the aircraft becomes airborne.

FIG. 3 is a flowchart for detecting and displaying aircraft position and other information according to the disclosed embodiments. Step 168 executes by determining whether the altitude and groundspeed of the aircraft are within the operating parameters of the system. If the aircraft is within these predetermined parameters all features of the system will operate. Alternatively, if only some parameters are met, only selected features of the system may be made operational. For example, if the aircraft is above 300 feet but below 1000 feet, only the airspeed and altitude portions of the system will be executed in step 178.

Step 170 executes by activating all of the light beams. Of course, the system may be configured to activate the lasers to generate the beams in any desired manner. For example, the beams may be projected simultaneously or one of the measurements may be taken first.

Step 172 executes to obtain the attitude of the aircraft from, for example, a gyroscope.

Step 174 executes by detecting the reflected or scattered light signals from the ground, air, or airborne particles. The light beams transmitted in step 170 are reflected or scattered and received by photosensors or other receiving devices. Step 176 executes by determining the Doppler shift of the received light signals caused by relative motion between the aircraft and the ground, in the case of the groundspeed measuring system or the air, in the case of the airspeed or relative wind measuring systems.

Using the Doppler shift of the received signals, step 178 executes to calculate the altitude and groundspeed of the aircraft, and the relative wind. The preferred embodiments of the present invention uses the four transmitted signals disclosed above to determine these values. Step 180 executes to update the display, such as display 140 in FIG. 2, with the altitude, ground speed, relative wind values, etc.

When the system determines that the aircraft is no longer in a takeoff or landing mode at step 182, the system may be placed in a standby mode as shown at 184 until it determines that the aircraft is within the predetermined airspeed or altitude parameters again.

Thus, the present invention discloses embodiments that determine, detect or calculate the position of an airborne vehicle, such as a helicopter. The position also is displayed to personnel in the vehicle. Updates are made simultaneously using methods of the present invention so that the displayed information is accurate and real-time. The displayed information includes altitude, ground speed and relative wind. During landing and takeoff operations, personnel in the vehicle use the information to avoid accidents and crashes.

It will be apparent to those skilled in the art that modifications and variations to the disclosed embodiments can be made without departing from the spirit or scope of the invention. Thus, it is intended that the present invention includes the modifications and variations provided that they come within the scope of any claims and their equivalents.

What is claimed is:

1. A method for detecting a position of an aircraft comprising:
   transmitting light beams;
   receiving reflected or backscattered light beams resulting from the transmitting;
   measuring differences between the transmitted and received light beams; and
   determining parameters based on the measuring to determine the position of the aircraft;
   wherein at least one of the transmitted or received light beams, or both, travel through one or more optical fibers.

2. The method of claim 1, wherein the transmitting includes transmitting the light beams at different angles.

3. The method of claim 1, wherein the transmitting includes emitting the light beams from a laser mounted on the aircraft.

4. The method of claim 1, further comprising updating a display according to the parameters.

5. The method of claim 1, further comprising displaying the parameters inside the aircraft.

6. The method of claim 1, wherein the measuring includes determining a Doppler shift from changes in frequency between the transmitted and received light beams.

7. The method of claim 1, wherein the parameters include altitude, ground speed, magnetic wind, relative wind, vertical velocity, airspeed, or ground velocity.

8. The method of claim 1 further comprising:
   comparing the parameters to operating parameters; and
   controlling operation of the aircraft based on the comparing.

9. The method of claim 1, further comprising:
   displaying the parameters such that an operator of the aircraft performs take-off or landing of the aircraft using the displayed parameters if the operator has substantially limited or no ground visibility.

10. The method of claim 9, wherein the displaying of the parameters is continually updated.

11. A method comprising:
    receiving at an aircraft reflected or backscattered light beams based on light beams transmitted from the aircraft, such that at least one of the transmitted or received light beams, or both, travel through one or more optical fibers;
    measuring differences between the transmitted and received light beams;
    determining parameters relating to a position of the aircraft according to the measured differences; and
    displaying the parameters in the aircraft.

12. The method of claim 11, further comprising:
    repeating the transmitting, receiving, and measuring; and
    updating the displaying based on subsequent ones of the measured differences.

13. The method of claim 11, further comprising using altitude, laser altitude, ground speed, relative wind, vertical velocity, airspeed, heading, or ground velocity as the parameters.

14. The method of claim 11, further comprising using relative wind velocity or magnetic wind velocity as the parameters.

15. The method of claim 11, further comprising using a heads-up display as the display.

16. The method of claim 11, further comprising:
    performing take-off or landing of the aircraft using the displayed parameters if an operator has substantially limited or no ground visibility.

17. A system for detecting position of an aircraft comprising:
    a transmitter configured to transmit a light beam from the aircraft;
    an optical receiver configured to receive reflected or backscattered light beams; and
    a measuring device configured to compare the transmitted and received beams and to calculate parameters with respect to the position of the object,
    wherein at least one of the transmitter and the optical receiver comprises an optical fiber configured to guide the transmitted or received light beams, or both.

18. The system of claim 17, further comprising a gyroscope to provide a reference for the transmitter and optical receiver, and to provide an angle of transmission for the light beams.

19. The system of claim 17, wherein the parameters include altitude, ground speed, magnetic wind, relative wind, vertical velocity, airspeed, or ground velocity.

20. The system of claim 17, wherein the measuring device is further configured to:
    compare the parameters to operating parameters; and
    control operation of the aircraft based on the comparing.

21. The system of claim 17, further comprising:
    a display configured to display the parameters, wherein an operator of the aircraft performs take-off or landing of the aircraft using the displayed parameters if the operator has substantially limited or no ground visibility.

22. The system of claim 21, wherein the display comprises a heads-up display.

* * * * *